United States Patent [19]

Neuroth

[11] Patent Number: 4,621,166
[45] Date of Patent: Nov. 4, 1986

[54] ADJUSTABLE LINE COVERING ELECTRICAL CONNECTOR

[76] Inventor: Robert J. Neuroth, 36723 N. Kerwin La., Ingleside, Ill. 60041

[21] Appl. No.: 522,977

[22] Filed: Aug. 15, 1983

[51] Int. Cl.⁴ .............................................. H02G 3/06
[52] U.S. Cl. .................................. 174/65 R; 285/162
[58] Field of Search ............ 74/501 R; 174/51, 65 R, 174/65 G; 248/27.3, 56; 285/DIG. 22, 92, 158, 162, 175, 192, 194, 319, 328, 399; 339/128; 403/252, 258, 260, 297; 411/354

[56]  References Cited

U.S. PATENT DOCUMENTS

| 2,823,932 | 2/1958 | Shigut ..................... 285/DIG. 22 X |
| 3,333,501 | 8/1967 | Pitcher ......................... 174/65 R X |
| 3,631,738 | 1/1972 | Harper ............................ 411/354 X |
| 3,746,373 | 7/1973 | Gold ....................... 285/DIG. 22 X |
| 3,814,467 | 6/1974 | Van Buren, Jr. ............... 285/162 X |
| 4,012,578 | 3/1977 | Moran et al. .................... 285/162 X |
| 4,021,604 | 5/1977 | Dola et al. ....................... 285/162 X |
| 4,032,178 | 6/1977 | Neuroth ......................... 174/65 R X |
| 4,229,614 | 10/1980 | Smolik ............................. 174/65 R X |
| 4,293,151 | 10/1981 | Manzel ............................ 174/65 R X |
| 4,468,535 | 8/1984 | Law .................................. 174/65 R |

Primary Examiner—Arthur T. Grimley
Assistant Examiner—D. A. Tone
Attorney, Agent, or Firm—John R. Garrett

[57] ABSTRACT

An adjustable connector secures an outer covering of an electrical line to an outlet box having an opening therein for receiving the connector. The connector comprises a body having a first open end and a second open end for insertion into the opening in the outlet box. The connector is secured in the opening of the outlet box and is contained within the second end of the body. A holder for holding the outer covering of the electrical line is also provided and is contained within the first end of the body.

9 Claims, 17 Drawing Figures

ADJUSTABLE LINE COVERING ELECTRICAL CONNECTOR

BACKGROUND OF THE INVENTION

The present invention relates in general to connectors for attaching conduit and other electrical line coverings to electrical outlet boxes or similar devices.

Numerous types of connectors are known in the prior art. The following U.S. patents disclose representative types of connectors: U.S. Pat. Nos. 4,012,578; 3,746,373; 3,631,738; 4,021,604; 2,823,932; 3,814,467; and 4,032,178. However, a large number of connectors, especially those which require no tools to install, cannot be sold in the United States because Underwriters Laboratories, Inc. (U.L.) will not approve these connectors. For example, U.L. requires that once the connector is secured to an outlet box or other similar device, the connector cannot be removed or unscrewed from the box. This presents a unique problem when a short length of conduit, for example, must be installed between two existing boxes. Connectors of the type which require no tools to install do not exist for this type of application.

SUMMARY OF THE INVENTION

The present invention involves an adjustable connector for securing an outer covering of an electrical line to an outlet box having an opening therein for receiving the connector. The connector comprises a means for providing a body having a first open end and a second open end for insertion into the opening in the outlet box. A means for securing the connector in the opening of the outlet box is provided and is contained within the second end of the means for providing a body. A means for holding the outer covering of the electrical line is also provided and is contained within the first end of the means for providing a body.

OBJECTS OF THE INVENTION

It is the primary object of the present invention to provide an improved connector for securing the outer covering of an electrical line to an outlet box.

It is another object of the present invention to provide a connector which allows for easy insertion of the outer covering into the connector.

It is yet another object to provide a connector which prevents removal of the outer covering when the outer covering is subjected to pulling or twisting forces.

It is a further object to provide a connector which may be easily adopted to receive various types of outer coverings.

It is another object to provide a connector which attaches snugly to electrical boxes having various wall thickness.

It is also another object to provide a connector which is reliable, yet economical to manufacture.

It is yet another object of the invention to allow installation of conduit between two fixed electrical boxes or similar points of attachment.

BRIEF DESCRIPTION OF THE DRAWINGS

The features of the present invention which are believed to be novel are set forth with particularity in the appended claims. The invention together with further objects and advantages may best be understood by reference to the following description taken in conjunction with the accompanying drawings, in the several figures of which like reference numerals identify like elements, and in which;

DESCRIPTION OF THE PREFERRED EMBODIMENT

Figure 1:
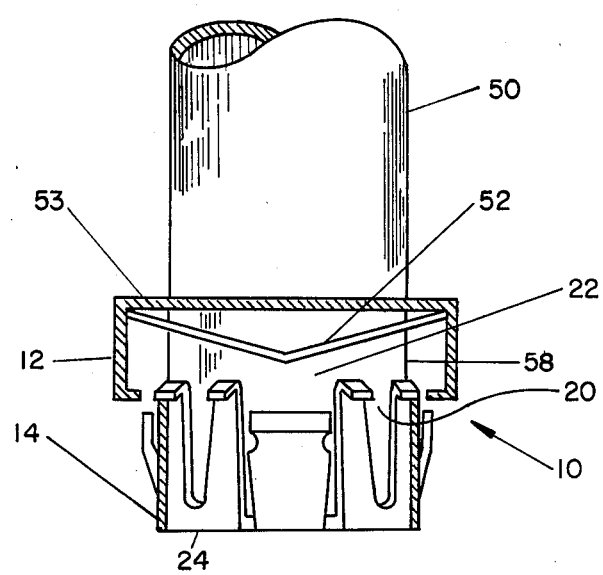
FIG. 1 is a cut away side view of the assembly of the novel connector.
Figure 2:
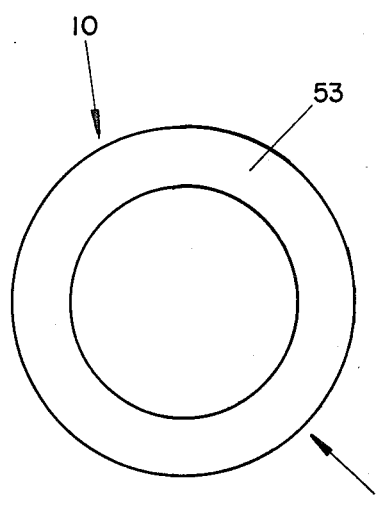
FIG. 2 is a top view of the connector.
Figure 3:
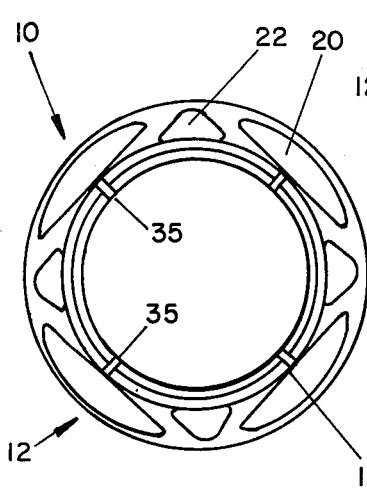
FIG. 3 is a bottom view of the connector.
Figure 4:
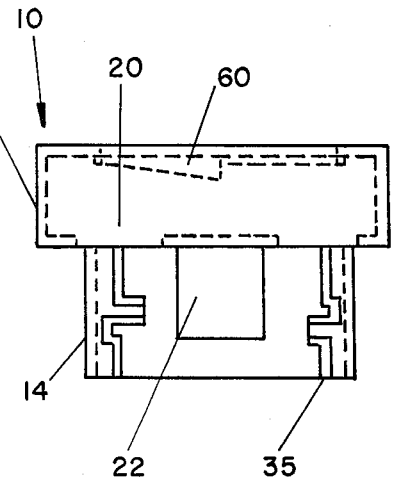
FIG. 4 is a side view of the connector outerbody.
Figure 5:
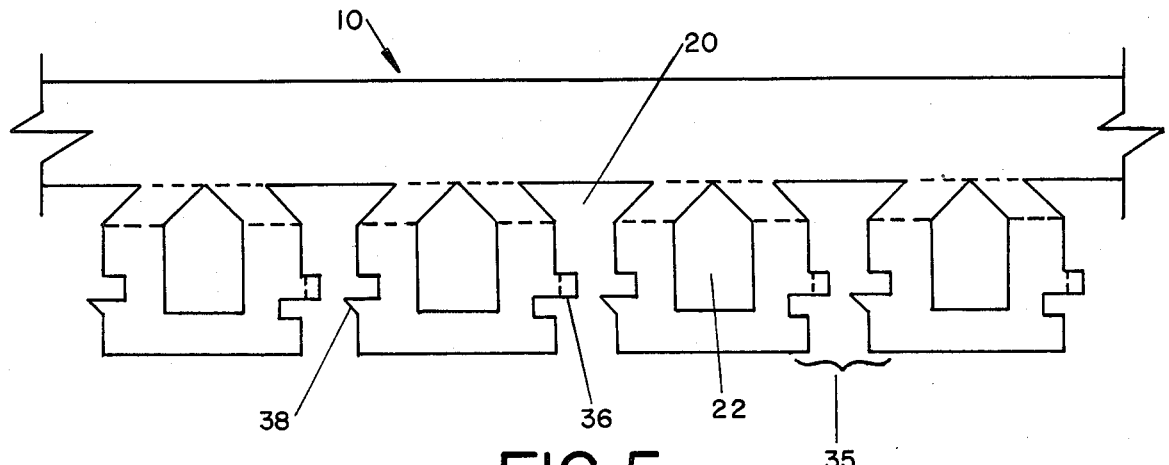
FIG. 5 is a partial side view of a metal stamping used to form the outerbody of the connector.
Figure 6:
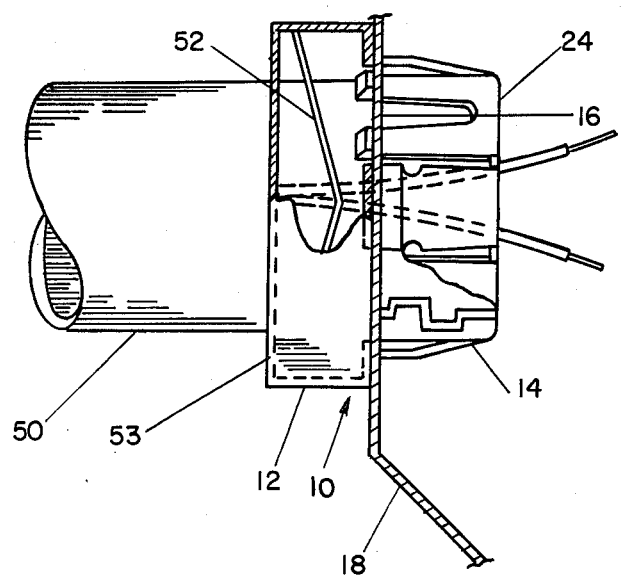
FIG. 6 is another cut away side view of the connector innerbody.
Figure 7:
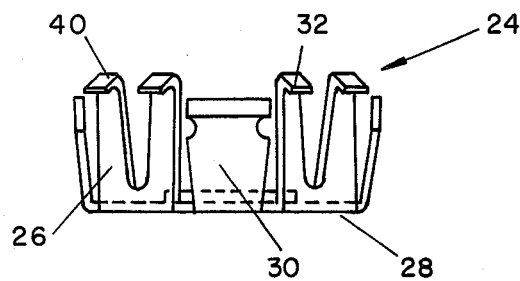
FIG. 7 is a side view of a means for securing the connector to an outlet box.
Figure 8:
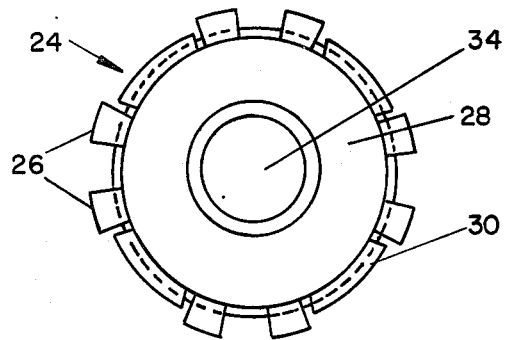
FIG. 8 is a bottom view of the securing means.
Figure 9:
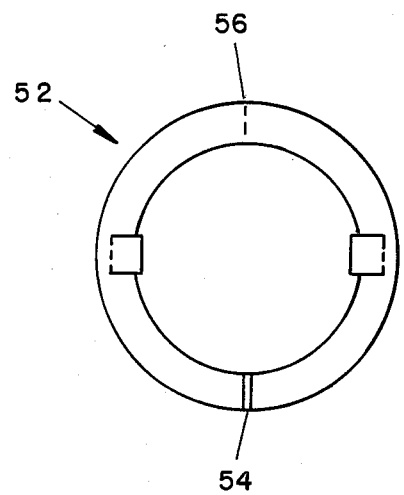
FIG. 9 is a top view of the moveable holding means for use with conduit.
Figure 10:
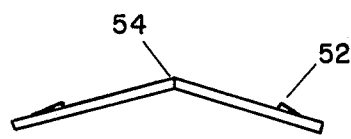
FIG. 10 is a side view of the FIG. 9 holding means.

The novel adjustable connector embodying the present invention can easily be adapted to secure thin wall conduit, BX type cable or other outer coverings of electrical lines to outlet boxes. BX type cable is the type which has spirally wound metal strips to provide continuous, alternating, helically contoured ribs and grooves therein. The novel connector is especially useful for adding conduit or BX between two closely spaced existing electrical boxes.

As shown in FIGS. 1–17, the connector has a body 10 with a first open end 12 and a second open end 14 for insertion into an opening 16 in an outlet box 18. The body 10 has a plurality of first openings 20 at the juncture of the first and second ends 12 and 14 and a plurality of second openings 22 in the second end 14. In the preferred embodiment, cold rolled steel tubing is used to form the body 10 into a unitary one-piece metal sleeve. The first end 12 has a size larger than the opening 16 in the outlet box 18 and the second end 14 has a size slightly smaller than the opening 16 so that the second end 14 can be inserted into the opening 16.

A spring steel holding insert 24 is used to secure the connector to the outlet box 18. The insert 24 is contained within the second end 14 of the body 10 and has a plurality of flexible gripper arms 26 attached to a base 28. The insert 24 also has a plurality of flexible tabs 30 attached to the base 28. When the insert is positioned in the second end 14, hooked ends 32 on the gripper arms 26 project through the first openings 20 and the tabs 30 project through the openings 22. The hooked ends 32 on the gripper arms 26 retain the insert 24 in the second end 14 of the body 10 and cooperate with the tabs 30 to engage the outlet box 18 around the opening 16. The base 28 has a hole 34 for allowing passage of the electrical lines. In the preferred embodiment the gripper arms 26 are arranged in pairs about the base 28.

The second end 14 of the body 10 has a split in at least one location 35 and has an expansion joint bridging the split. The expansion joint has a pair of inwardly bent tabs 36 and 38 which, when assembled, are located in a slot 40 in the gripper arms 26. The gripper arms 26 thereby also function to prevent separation of the tabs 36 and 38 of the expansion joint.

FIGS. 1, 6, 9 and 10 show an embodiment of the present invention for securing a conduit 50. A substantially oval ring 52 is contained within the first end 12 of the body 10 and retained there by an inward projecting shoulder 53 on the first end 12. The ring 52 has a predetermined bend located along its minor axis at locations 54 and 56 and is bent such that the resulting hole in the ring 52 is substantially circular. The ring 52 is also split at location 54 and is positioned in the first end 12 such that bend locations 54 and 56 are located away from the shoulder 53.

An end 58 of the conduit 50 is inserted through the first open end 12 of the body 10 and through the ring 52. The combination of the split and bends in the ring 52 allow the conduit 50 to be inserted, but prevent removal. When a force tends to pull the conduit 50 out of the connector, the ring 52 contacts the shoulder 53 thereby deforming the ring 52 and causing the ring 52 to bite into the conduit 50.

Figure 11:
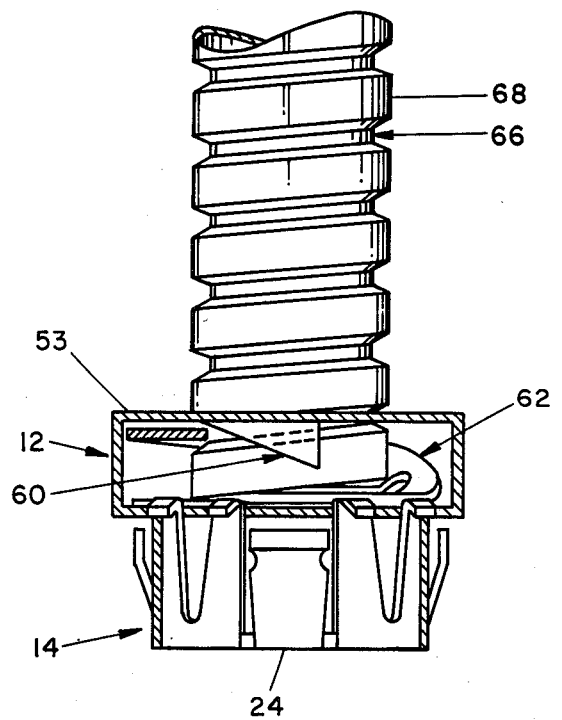
FIG. 11 is a cut away side view of another embodiment of the novel connector.
Figure 12:
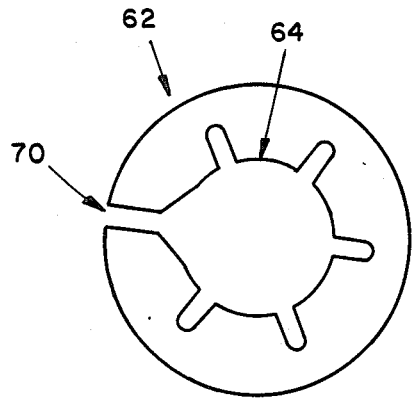
FIG. 12 is a top view of a holding means for use with BX type cable.
Figure 13:
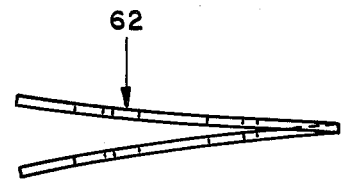
FIG. 13 is a side view of the FIG. 12 holding means.

FIGS. 11–15 illustrate one alternative embodiment of the present invention for use with BX type outer coverings of electrical lines. In FIG. 11 the first end 12 has a stop tab 60 projecting into the first end 12 from the shoulder 53. A flexible locking ring 62 is contained within the first end 12 and has a plurality of inward projecting legs 64 for engaging the grooves 66 in the outer covering 68. A split 70 is provided in the ring 62 and the ring has a contour such that the outer covering 68 may be screwed into the ring. However, when there is an attempt to unscrew the outer covering 68, an edge of the ring 62 at the split 70 engages the stop tab 60 causing the ring 62 to deform and lock onto the outer covering 68.

Figure 14:
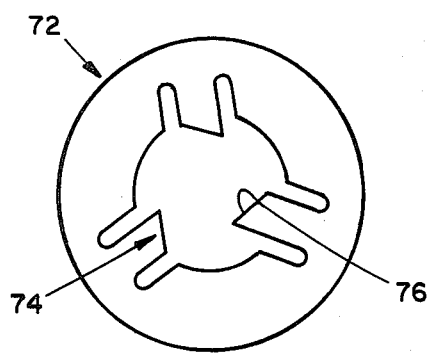
FIG. 14 is a top view of a snap-in holding means for use with BX type cable.
Figure 15:
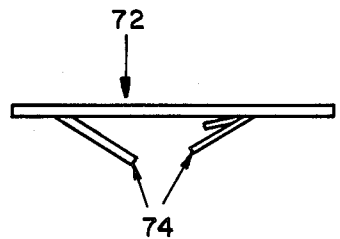
FIG. 15 is a side view of the FIG. 14 holding means.
Figure 16:
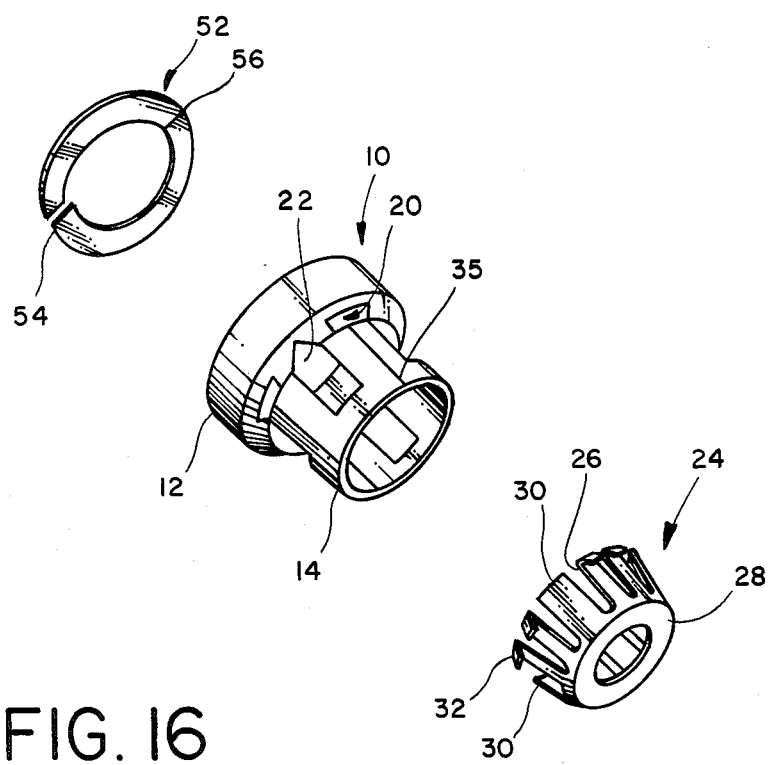
FIGS. 16 and 17 are exploded and unexploded perspective views of the novel connector.
Figure 17:
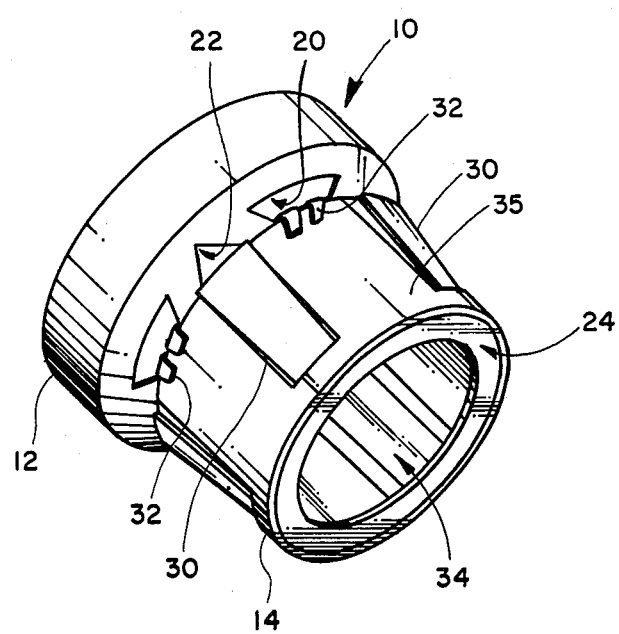

An alternative structure is shown in FIGS. 14 and 15 wherein a flexible locking ring 72 is provided with three inwardly projecting legs 74 of varying lengths and angles such that they mate with the grooves 66 in the BX type covering.

The ends 76 of the legs 74 are cut on an angle such that when there is an attempt to unscrew the BX covering the legs 74 tend to cut into and lock onto on the grooves 66 of the covering.

The invention is not limited to the particular details of the apparatus depicted and other modifications and applications are contemplated. Certain other changes may be made in the above-described apparatus without departing from the true spirit and scope of the invention herein involved. For example, other structures may be utilized for the means for holding the outer covering of the electrical line, when other types of coverings are used, such as flexible insulation coverings. It is intended, therefore, that the subject matter in the above depiction shall be interpreted as illustrative and not in a limiting sense.

What is claimed is:

1. An adjustable connector for securing an outer covering of an electrical line to an outlet box having an opening therein for receiving said connector, comprising:

means for providing a body having a first open end and a second open end for insertion into the opening in the outlet box, said means for providing a body being a unitary one piece metal sleeve with said first end having a size larger than the opening in the outlet box and said second end having a size slightly smaller than said opening so that said second end can be inserted into said opening, said means for providing a body having a plurality of first openings at a juncture of said first and second ends and a plurality of second openings in said second end;

means for securing said connector in the opening of the outlet box and contained within said second end of said means for providing a body; and means for holding the outer covering of the electrical line and contained within the first end of the means for providing a body.

2. The connector described in claim 3 wherein said means for securing has a plurality of flexible gripper arms attached to a base and said gripper arms having hooked ends projecting through said first openings in said metal sleeve and a plurality of flexible tabs attached to said base and projecting through said second openings in said second end of said metal sleeve, said hooked ends of said gripper arms retaining said means for securing within second end of said metal sleeve and said hooked ends of said gripper arms cooperating with said tabs to engage the outlet box around the outlet opening.

3. The connector described in claim 2 wherein said base has a hole for allowing the passage of the electrical lines.

4. The connector described in claim 2 wherein said gripper arms are arranged in pairs about said base.

5. The connector described in claim 4 wherein said second end of said sleeve has a split in at least one location and has an expansion joint bridging the split and said pair of gripper arms engage said expansion joint to prevent separation of joint.

6. The connector described in claim 5 wherein said pair of gripper arms define an elongated slot and said expansion joint has a pair of inwardly bent tabs which are located in said slot near a bottom of said slot, said means for securing being retained in position in said second end of said sleeve by said tabs engaging the bottom of said slot and said hooked ends of said gripper arms engaging said first opening in said sleeve.

7. The connector described in claim 3 adapted to receive as the outer covering of the electrical line a conduit wherein said first end of said means for providing a body has an inward projecting shoulder and said means for holding is a substantially oval ring having a predetermined bend located along a minor axis of said oval ring such that the resulting hole in the ring is substantially circular, said ring also being split at one of the bend locations and said ring being positioned within said first end such that said bend is away from said shoulder wherein, when said conduit is inserted through said first end of said means for providing a body of said connector, said ring allows said conduit to slide through said hole, but prevents said conduit from being removed by said ring engaging said shoulder on said first end and thereby flattening and biting into said conduit.

8. The connector described in claim 3 adapted to receive as the outer conering of the electrical line a covering of the type which is spirally wound to provide continuous, alternating, Hellically contoured ribs and grooves thereon, wherein said first end of said means for providing a body has an inward projecting shoulder with at least one stop tab projecting into said first end therefrom and said means for holding is a split locking flexible ring having a plurality of inward projecting legs for engaging said grooves in said outer covering of the electrical line whereby when there is an attempt to unscrew said outer covering said stop tab engages one end of said ring at said split causing said ring to deform and said legs to bind against said ribs to prevent removal of said outer covering from said ring.

9. The connector described in claim 3 adapted to receive as the outer covering of the electrical line a covering of the type which is spirally wound to provide continuous, alternating Hellically contoured ribs and grooves therein, wherein said first end of said means for providing a body has an inwardly projecting legs, the end ends of said legs being formed with a predetermined angle and each of said legs having a different length and angle with respect to said ring to mate with said grooves in said outer covering whereby, when there is an attempt to unscrew said outer covering, said ends of said legs bind against said ribs of said outer covering.

* * * * *